United States Patent [19]

Mimms et al.

[11] Patent Number: 5,315,964
[45] Date of Patent: May 31, 1994

[54] PORTABLE CAT LITTER BOX WITH ELECTRICALLY POWERED VENTILATION

[76] Inventors: Donald H. Mimms; Pamala V. Mimms, both of 17 Raymond Way, Ashland, Mass. 01721

[21] Appl. No.: 59,608

[22] Filed: May 12, 1993

[51] Int. Cl.$^5$ .............................................. A01K 29/00
[52] U.S. Cl. .................................. 119/165; 119/15
[58] Field of Search ............... 119/161, 163, 164, 165, 119/15

[56] References Cited

U.S. PATENT DOCUMENTS

| | | | |
|---|---|---|---|
| 3,871,331 | 3/1975 | Bseau | 119/164 |
| 4,095,559 | 6/1978 | Griffith | 119/165 |
| 5,044,325 | 9/1991 | Miksitz | 119/165 |
| 5,113,801 | 5/1992 | Rotstein et al. | 119/163 |
| 5,134,972 | 8/1992 | Compagnucci | 119/165 |
| 5,140,948 | 8/1992 | Roberts | 119/165 |

FOREIGN PATENT DOCUMENTS 1316203  5/1973  United Kingdom ................ 119/164

Primary Examiner—John G. Weiss
Assistant Examiner—Todd E. Manahan
Attorney, Agent, or Firm—John E. Toupal; Harold G. Jarcho

[57] ABSTRACT

A litter box has a fluid impervious bottom wall and fluid impervious side walls defining an exhaust opening. An insert is disposed at a peripheral portion of the bottom wall and includes a substantially vertical screen separated from the side walls by an exhaust channel communicating with the exhaust opening. A blower produces air flow from the receptacle into the exhaust channel for discharge through the exhaust opening. Also included are electrical blower controls including a timer switch, a manually operated on-off switch and a pressure switch all connected in parallel.

16 Claims, 1 Drawing Sheet

PORTABLE CAT LITTER BOX WITH ELECTRICALLY POWERED VENTILATION

BACKGROUND OF THE INVENTION

This invention relates generally to a cat litter box and, more particularly, to a cat litter box providing ventilation of its litter content.

House cats often are confined for extended periods in dwellings such as houses and apartments. The maintenance of sanitary conditions in such dwellings requires the use of litter boxes. To prevent the generation of unpleasant odors, the litter content of litter boxes must be frequently replaced. The requirement for frequent litter replacement is both costly and labor intensive.

In attempts to diminish the above described problem, litter boxes including powered ventilation systems have been proposed. Litter boxes of that type are disclosed, for example, in U.S. Pat. Nos. 4,095,559 and 4,546,727. Although somewhat alleviating the problems associated with frequent litter replacement, prior ventilated litter boxes have not been completely satisfactory because of disadvantages such as high cost, structural complexity and insufficient ventilating flow.

The object of this invention, therefore, is to provide an improved litter box having an improved powered ventilation system.

SUMMARY OF THE INVENTION

The invention is a litter box including a base having a fluid impervious bottom wall, and fluid impervious side walls defining an exhaust opening and together with the bottom wall defining an open receptacle; an insert disposed at a peripheral portion of the bottom wall and adjacent to a substantial length portion of the side walls, the insert including a substantially vertical screen separated from the length portion of the side walls by an exhaust channel communicating with the exhaust opening and an upper wall covering the exhaust channel; a flexible tubulation communicating with the exhaust opening; and a blower for producing air flow from the receptacle into the exhaust channel for discharge through the exhaust opening and the tubulation. Also included are a support for supporting the base on a surface and including a pressure switch activated from an inactive to an active condition by the presence of a predetermined weight in the receptacle, and an electrical control including a power cord operatively connected between the blower and the pressure switch and adapted to energize the blower in response to the active condition thereof. The pressure switch produces ventilating air flow when a cat occupies the litter box.

According to one feature of the invention, the electrical control includes an electrical timer switch connected between the power cord and the blower, a manually operated on-off switch connected in parallel with the timer switch and the pressure switch. Selective periodic or constant blower operation can be obtained by the timer and on-off switches.

According to another feature of the invention, the blower is mounted on the base adjacent to the exhaust opening. This configuration provides the litter box with a compact arrangement.

According to yet another feature of the invention, the electrical control is mounted on the base. Further structural simplicity is facilitated by this arrangement.

According to still another feature, the invention includes an adjustable baffle coupled to an outer end of the tubulation. The baffle facilitates air-tight mounting of the tubulation in a window opening.

DESCRIPTION OF THE DRAWINGS

These and other objects and features of the ivention will become more apparent upon a perusal of the following description taken in conjunction with the accompanying drawings wherein.

DESCRIPTION OF THE PREFERRED EMBODIMENT

Figure 1:
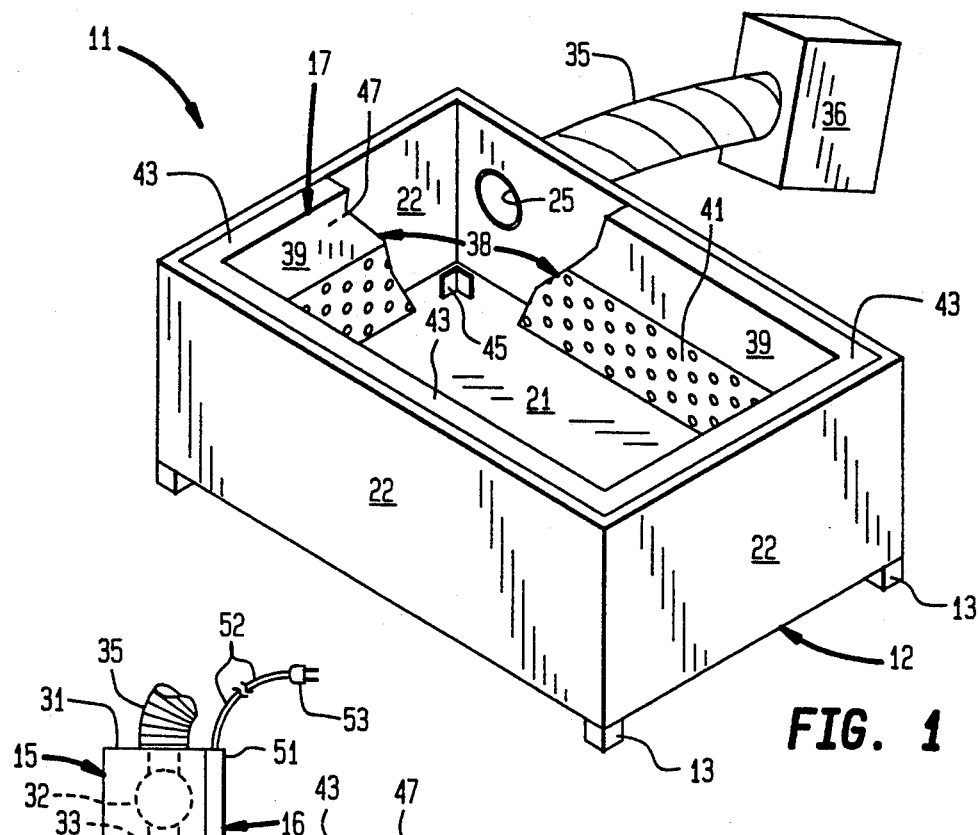
FIG. 1 is a perspective view of a ventilated litter box according to the invention.

A litter box 11 includes a portable base 12 supported by three conventional legs 13 and a pressure sensitive switch leg 14, a ventilation assembly 15, an electrical control assembly 16 and an insert assembly 17. Forming the base 12 are a fluid impervious bottom wall 21 and fluid impervious vertical side walls 22, projecting upwardly from an outer periphery thereof and defining therewith a receptacle 23. Preferably, the base 12 is an integrally molded plastic unit. An exhaust opening 25 is formed in a length portion 27 of one of the side walls 22.

The ventilation assembly 15 includes a housing 31 retaining a blower 32 and defining an inlet 33 and an outlet 34. Also included in the ventilation assembly 15 is a flexible hose tubulation 35 having one end communicating with the outlet 34 of the housing 31 and an outer end coupled to an adjustable baffle assembly 36. The housing 31 is mounted on the elongated wall portion 27 in a position that provides communication between the exhaust opening 25 and the inlet 33 of the housing 31.

Forming the insert assembly 17 are vertical wall sections 38 each including an upper impervious portion 39 and a lower perforated portion 41, and upper wall sections 43 joined to top edges of the vertical wall sections 38. The insert assembly 17 is retained in position by upwardly projecting tabs 45 on the base 12. Defined between the vertical wall sections 38, the elongated side walls 22 and the upper wall sections 43 is an exhaust channel 47 that communicates with the exhaust opening 25.

The electrical control assembly 16 includes a control box 51 mounted closely adjacent to the ventilation assembly 15 and the pressure sensitive switch leg 14. Extending out of the control box 51 is a power cord 52 terminated by a plug 53 for insertion into a conventional electrical outlet socket (not shown).

Figure 4:
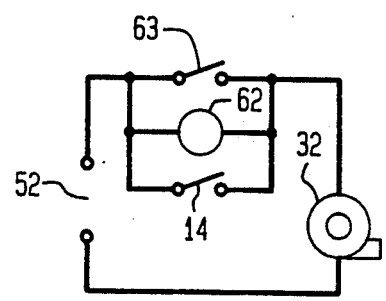
FIG. 4 is a schematic electrical circuit diagram of a control circuit of the litter box shown in FIG. 1.
Figure 3:
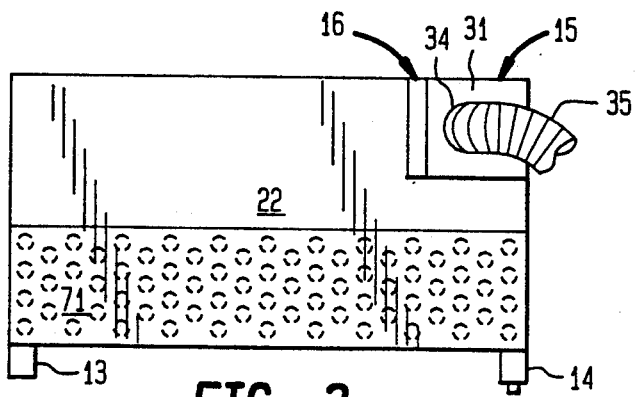
FIG. 3 is a rear elevational view of the litter box shown in FIG. 1.

The control box 51 retains electrical control circuitry 61 illustrated in FIG. 4. Included in the control circuit 61 is a conventional cycle time switch 62 connected between the power cord 52 and the blower 32 and an on-off electrical switch 63 connected in parallel with the timer switch 62. As shown in FIG. 4, the pressure switch 14 is connected in parallel with the parallel combination of the timer switch 62 and the on-off switch 63.

OPERATION

Figure 2:
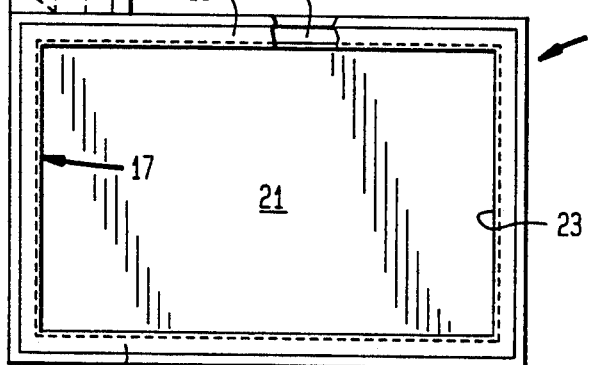
FIG. 2 is a top view of the litter box shown in FIG. 1.

During use of the litter box 11, the base 12 is positioned on a suitable surface adjacent to a ventilation opening such as a window (not shown). The baffle assembly 36 then is installed to air tightly seal the opening and establish fluid communication between the outer environment and the outer end of the flexible hose 35. After filling of the receptacle 23 with a suitable litter material 71, the plug 53 is inserted into an electrical outlet to energize the blower 32 through the timer switch 62. Such energization is selectively periodic and determined by a desired setting of the cycle timer switch 62. During periods of energization, the blower 32 produces air flow over and through the litter material 71 and into exhaust channel 47 through the screen wall 41. As illustrated by arrows in FIG. 2, that air flow which includes odoriferous gases emanating within the litter material 71 then is drawn through the exhaust opening 25 into the flexible tube 35 for discharge through the outer end thereof into a surrounding environment.

In the event that continuous ventilation of the litter box 11 is desired, the on-off switch 63 can be closed to produce continuous energization of the blower 32. In addition, upon entry of a cat into the receptacle 23, the resultant increased weight of the base 12 and its contents actuate the pressure switch 14 from an inactive to an active closed condition thereby energizing the blower 32. In the absence of an animal within the receptacle 23, a predetermined setting maintains the pressure switch 14 in an inactive open condition in response to the normal weight of the litter box 11 and a suitable volume of litter material 71.

Obviously, many modifications and variations of the present invention are possible in light of the above teachings. For example, although particularly well suited for use with cats, the invention also can be used for other animals. It is to be understood, therefore, that the invention can be practiced otherwise than as specifically described.

What is claimed is:

1. A litter box for animals and comprising:
   base means having a fluid impervious bottom wall, and fluid impervious side walls together defining an open receptacle; and at least one of said side walls having an exhaust opening formed therein;
   an insert means disposed at a peripheral portion of said bottom wall and adjacent to a substantial length portion of said side walls, said insert means comprising substantially vertical perforated wall section means separated from said length portion of said side walls by an exhaust channel communicating with said exhaust opening and an upper wall covering said exhaust channel;
   a flexible tubulation communicating with said exhaust opening;
   a blower for producing air flow from said receptacle into said exhaust channel for discharge through said exhaust opening and said tubulation;
   support means for supporting said base means on a surface and including a pressure switch activated from an inactive to an active condition by the presence of a predetermined weight in said receptacle; and
   electrical control means including a power cord operatively connected between said blower and said pressure switch, and adapted to energize said blower in response to said active condition of said pressure switch; said electrical control means comprising an electrical timer switch connected between said power cord and said blower, a manually operated on-off switch connected in parallel with said timer switch, and wherein said pressure switch is connected in parallel with said on-off switch and said timer switch.

2. A litter box according to claim 1 wherein said blower is mounted on said base means adjacent to said exhaust opening.

3. A litter box according to claim 2 including an adjustable baffle means coupled to an outer end of said tubulation means and adapted for air-tight mounting in a window opening.

4. A litter box according to claim 3 wherein said electrical control means is mounted on said base means.

5. A litter box according to claim 1 wherein said blower is mounted on said base means adjacent to said exhaust opening.

6. A litter box according to claim 5 including an adjustable baffle means coupled to an outer end of said tubulation means and adapted for air-tight mounting in a window opening.

7. A litter box according to claim 6 wherein said electrical control means is mounted on said base means.

8. A litter box according to claim 1 including an adjustable baffle means coupled to an outer end of said tubulation means and adapted for air-tight mounting in a window opening.

9. A litter box according to claim 8 wherein said electrical control means is mounted on said base means.

10. A litter box according to claim 1 wherein said electrical control means is mounted on said base means.

11. A litter box according to claim 1 wherein said blower, said pressure switch and said electrical control means are all mounted on said base means.

12. A litter box according to claim 11 wherein said blower, said pressure switch and said electrical control means are mounted in closely adjacent positions on said base means.

13. A litter box according to claim 1 wherein said vertical wall section means comprises a lower perforated portion and an upper fluid impervious portion.

14. A litter box according to claim 13 wherein said substantial length portion comprises the entire length of said side walls.

15. A litter box for animals and comprising:
   base means having a fluid impervious bottom wall, and fluid impervious side walls together defining an open receptacle; and at least one of said side walls having an exhaust opening formed therein;
   an insert means disposed at a peripheral portion of said bottom wall and adjacent to a substantial length portion of said side walls, said insert means comprising a substantially vertical wall section means having a lower perforated portion and an upper fluid impervious portion, said vertical wall section being separated from said length portion of said side walls by an exhaust channel communicating with said exhaust opening and an upper wall covering said exhaust channel;
   a flexible tubulation communicating with said exhaust opening;
   a blower for producing air flow from said receptacle into said exhaust channel for discharge through said exhaust opening and said tubulation;
   support means for supporting said base means on a surface and including a pressure switch activated from an inactive to an active condition by the presence of a predetermined weight in said receptacle; and electrical control means including a power cord operatively connected between said blower and said pressure switch, and adapted to energize said blower in response to said active condition of said pressure switch.

16. A litter box according to claim 15 wherein said substantial length portion comprises the entire length of said side walls.

* * * * *